(12) United States Patent
Griffiths

(10) Patent No.: US 7,179,410 B2
(45) Date of Patent: Feb. 20, 2007

(54) FOAM PLASTICS MANUFACTURING METHOD AND MACHINE

(75) Inventor: Anthony Charles Murray Griffiths, Peyla Paphos (CY)

(73) Assignee: Cannon Viking Limited, Stretford (GB)

( * ) Notice: Subject to any disclaimer, the term of this patent is extended or adjusted under 35 U.S.C. 154(b) by 206 days.

(21) Appl. No.: 10/344,122

(22) PCT Filed: Jul. 26, 2001

(86) PCT No.: PCT/GB01/03376

§ 371 (c)(1),
(2), (4) Date: Feb. 7, 2003

(87) PCT Pub. No.: WO02/11967

PCT Pub. Date: Feb. 14, 2002

(65) Prior Publication Data

US 2003/0183971 A1    Oct. 2, 2003

(30) Foreign Application Priority Data

Aug. 8, 2000  (GB) ................. 0019507.3

(51) Int. Cl.
*B29C 44/20* (2006.01)
*B29C 44/28* (2006.01)

(52) U.S. Cl. .......... 264/51; 264/237; 425/4 C; 425/89; 425/224; 425/817 C (58) Field of Classification Search ........... 364/51, 364/237; 425/4 C, 817 C, 89, 224
See application file for complete search history.

(56) References Cited

U.S. PATENT DOCUMENTS

| | | | |
|---|---|---|---|
| 3,476,845 A * | 11/1969 | Buff et al. | 264/54 |
| 3,659,981 A | 5/1972 | Ferstenberg | |
| 3,812,227 A * | 5/1974 | Blackwell et al. | 264/54 |
| 3,832,099 A * | 8/1974 | Berg | 425/4 C |
| 3,972,667 A | 8/1976 | Hanusa | |
| 3,984,195 A | 10/1976 | Del Carpio | |
| 4,074,960 A | 2/1978 | Dockray et al. | |
| 4,093,109 A * | 6/1978 | Schrader | 222/527 |
| 4,097,210 A | 6/1978 | Romanillos | |

(Continued)

FOREIGN PATENT DOCUMENTS

EP        0 000 058 A1   12/1976

(Continued)

OTHER PUBLICATIONS

PCT Search Report mailed Jan. 31, 2001 in PCT Ser. No. PCT/GB01/03376.

*Primary Examiner*—Allan R. Kuhns
(74) *Attorney, Agent, or Firm*—J. Clinton Wimbish; Charles W. Calkins; Kilpatrick Stockton LLP (57) ABSTRACT

Production of foamed materials in a horizontal machine, and said machine itself, reactants being fed to a conveyor at one end of the machine and foam produced being removed at the other end, wherein the foam is generated in an expansion chamber defined at its inlet by a closed reactant feed zone, at its outlet by a body of foam already expanded or partly expanded, and laterally and vertically by travelling webs, the webs giving a diverging cross section to the chamber.

24 Claims, 7 Drawing Sheets

U.S. PATENT DOCUMENTS

| | | | |
|---|---|---|---|
| 4,102,619 A * | 7/1978 | Bokelmann | 425/89 |
| 4,102,621 A * | 7/1978 | Talbert | 425/224 |
| 4,120,626 A | 10/1978 | Keller | |
| 4,128,611 A | 12/1978 | Kolakowski et al. | |
| 4,150,075 A | 4/1979 | Schmitzer et al. | |
| 4,150,705 A | 4/1979 | Muller | |
| 4,370,117 A | 1/1983 | Smith | |
| 4,606,715 A * | 8/1986 | Larson | 425/110 |
| 5,275,544 A * | 1/1994 | Marlowe | 425/4 R |
| 5,409,649 A | 4/1995 | Pool | |
| 5,665,286 A | 9/1997 | Sulzbach et al. | |
| 5,665,287 A | 9/1997 | Fiorentini et al. | |
| 5,804,113 A | 9/1998 | Blackwell et al. | |
| 6,036,898 A * | 3/2000 | Sulzbach et al. | 264/51 |

FOREIGN PATENT DOCUMENTS

| | | |
|---|---|---|
| EP | 0 044 226 A1 | 1/1982 |
| EP | 0 044 478 A1 | 1/1982 |
| EP | 0 058 553 A1 | 8/1982 |
| EP | 0 645 226 A2 | 3/1995 |
| GB | 1 105 422 | 3/1968 |
| GB | 1 257 797 | 12/1971 |
| GB | 1 436 797 | 5/1976 |
| GB | 0 540 334 | 2/1979 |
| GB | 2 044 663 | 1/1980 |
| GB | 2 047 157 | 11/1980 |
| GB | 2050922 | 1/1981 |
| GB | 2 138 733 | 10/1984 |
| GB | 1 220 258 | 1/1997 |
| WO | WO 93/09934 | 5/1993 |
| WO | WO 02/11967 | 2/2002 |

* cited by examiner

FOAM PLASTICS MANUFACTURING METHOD AND MACHINE

FIELD OF INVENTION

The invention relates to a method and machine for making polyurethane and other plastics foams.

BACKGROUND

Essentially, foaming machines receive a mixture of reactants and provide a path in which initial foaming of the reactant mix and subsequent curing to form a self supporting polymer foam can take place. Blocks are then cut and matured.

In one form of machine the polymer foam is taken off vertically. Such machines are successful but require careful operation, not always easy for those familiar with the usual horizontal machines, to ensure that the foaming reaction takes place freely and that the foam develops sufficient early strength for the spiked conveyors used to engage the foam and carry it away.

In the other and by far the commoner form of machine, which is the one the invention is concerned with, the polymer foam is taken away generally horizontally. The machine is essentially a long channel, with reactants fed at one end to travelling webs of paper or plastics and the foam taken off at the other. The machines inherently have a high production rate and are very large, production rates of 100 kg to 500 kg minute and lengths of over 100 meters being common. Capital costs are high, yet very often curing and handling the foam produced is a limiting factor, or markets are modest, and plants are run only part of the day. A smaller, low-production machine would be desirable to make best use of the investment in a plant and produce foam for local markets rather than transporting high-volume relatively low-value products long distances.

The high production rates are however inherent from the nature of the process in current machines. Prior to foaming, the reactants are dense compared to the initially-fluid foam they give rise to. The conveyors taking the foam away, sloping forwards to ensure that foam does not simply escape from the back of the machine, have then to run fast enough to obviate the tendency of younger, high-density material to underrun older, low density material in the forward direction of the conveyor. If materials did underrun, with lighter foam floating on top of denser material, finished foam of uneven properties would be produced, but this is prevented by taking the older material away as fast as the younger material would otherwise run forward under it.

The problem is worsened by the limited steepness of profile that still-fluid foam can sustain. If the limit is exceeded the foam will slump back over younger, denser materials independent of underrunning tendencies as such, and to obviate slumping with a practical height of block, as well as the escape of reactants referred to above, the initial part of the conveyor is invariably sloped downwards in the direction of travel. This increases the tendency for underrunning and hence further increases minimum conveyor speeds.

PRESENT PROPOSALS

To make a lower production rate, and hence smaller machine, possible, some change of principle is needed and we have seen that scope for it lies in the early part of foam production in a horizontal machine.

Horizontal is to be understood in a broad sense, as opposed to vertical, given that parts of the foam path can be inclined, indeed a whole machine while broadly horizontal could be designed for a site that was not level or for example to deliver foam product to a high or lower floor. However all existing horizontal machines operate with the reactants applied to an open, initially-inclined conveyor, sometimes directly, sometimes indirectly through a trough that feeds the conveyor, but with no confinement of materials during the initial part of the foaming reaction. Bottom and side webs of paper or plastics film are used, but top webs where used are not applied in the early stages.

We have seen that this principle of open operation needs to be abandoned, the reactants instead being fed without exposure to the atmosphere and the foam being confined in a closed expansion chamber at least while fluid enough to slump. Such confinement, in a process and machine as defined in the claims herein, makes a low production rate possible. Materials cannot run back and escape as there is nowhere to run to, nor can they slump, and with a suitable inclination of the part of the conveyor exposed to still-fluid foam, according to the nature of the foam being produced, they will not underrun. Laterally and vertically, that is at sides, bottom and top of the expansion chamber, they are confined by travelling webs and confinement and control is therefore complete.

A new machine will normally be built with no initial downward slope of the part of the conveyor forming the base of the expansion chamber but, particularly where slumping rather than underrunning as such is the tendency to be avoided, a downward (forward) slope of up to 10°, preferably not more than 4°, may be acceptable. Existing machines may then be converted to the new form.

Preferably the conveyor when carrying still-fluid foam is horizontal. Alternatively the tendency for underrunning is reduced or obviated at source by having at least part of the conveyor within the expansion chamber sloping backward i.e. upward in the direction of travel, provided the body of foam produced does not have to change direction after it has ceased to be fluid. Typically, any slope of the conveyor will be for the initial part of the foam expansion only, exiting foam being for example at up to 20–30% of maximum expansion and in any case at most at 60% of maximum expansion so that a change of direction does not disrupt it. The slope may for example conveniently be up to 15° to the horizontal, but with a steeply inclined top web it can be steeper, for example up to 30° to the horizontal.

In the expansion chamber, the walls diverge so that the cross section increases in the direction of travel in a way matched to the expansion rate of the foam, the reactant feed rate of course being determined to keep the enclosure filled. The volume of the expansion enclosure and hence dwell time in it is at least sufficient to prevent foam that has exited the enclosure slumping backwards under its own weight, if expansion is not being conducted wholly enclosed. Typically, the volume of the expansion enclosure is such that foam emerging from it is at least at 50% of its maximum expansion, and preferably 70% or more for a standard flexible polyurethane foam, but for some foams e.g. MDI based flexible high resilience foams or rigid polyurethane foams, which develop gel-strength earlier, it can be down to 30%.

Production can then be at low rates, with foam coming to a handleable stage over a short distance. Equally the invention is flexible. A low production rate machine may be installed and invariably used as such. However there is no reason why a machine new as regards its foam-production end should not be installed with a long conveyor and movable block-cutting position. It can then be used at conventional speeds if certain grades of foam are regularly produced in greater amounts than others or occasional surges in demand are to be met, the newly-facilitated low speeds being used otherwise.

FURTHER BACKGROUND

In considering the invention it is important to understand the basic geometry of conventional foam slabstock processes, the principles of foam flow-back (slumping) and foam under-running, and how the conveyor angle influences them. It is these factors, which limit the degree by which the dimensions of a conventional machine can be reduced.

Figure 1:
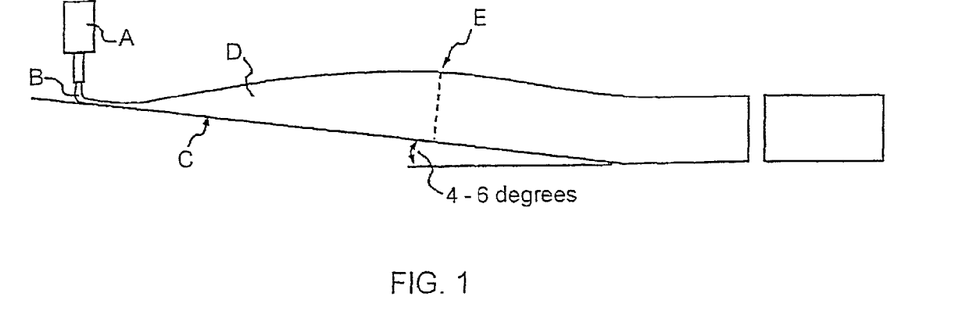
FIG. 1. Conventional horizontal machine

In the drawings, FIG. 1 shows a conventional foam slabstock process. Foam slabstock processes have traditionally used a downwardly inclined conveyor (C), lined with paper or plastics film, onto which a mixing head (A) continuously pours the liquid reactant mix (B). The chemical reaction causes foam expansion up to the full rise position (E). The speed of the conveyor and the output rate of the liquid reactant mix determine the height of the foam block. The book "Flexible Polyurethane Foams" published by Dow Plastics, second edition 1997, at pages 5.18 to 5.21, for example describes such a process.

The expanding foam is relatively fluid during most and especially in the early parts of its expansion. This means that there is a limit to the height of a bank of expanding foam before it will flow (slump) under its own weight. It is necessary therefore to incline the conveyor downwards in the direction of production to prevent the expanding foam (D) flowing backwards. The higher the foam block, the more the conveyor needs to be inclined. Typically an inclination angle of about 4 to 6 degrees is used for a block height of up to 1.2 meters.

The inclination of the conveyor brings to the fore the potential problem of under-running. Under-running is where younger, higher density, lower viscosity liquid or partially expanded foam flows underneath older, lower density, higher viscosity material. The result of under-running is densification and sometimes compression lines within the foam block, which render the foam product sub-standard.

Figure 2A:
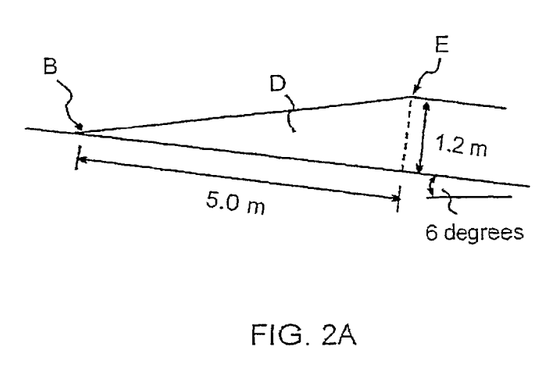
FIGS. 2A, 2B. Schematic (2A) of foam rise in the machine of FIG. 1, with theoretical steepened and shortened initial conveyor section (2B)

In the drawings, FIG. 2A shows a geometric representation of the foam rise profile of FIG. 1. The area (D) contained within the triangle from laydown (B) to full rise (F) represents the volume of foam which has been generated by the mass of foam chemicals dispensed within the rise time of the foam. The angle of inclination of the conveyor is 6 degrees. To reduce the dimensions of the machine, say to half those of FIG. 2A, whilst still keeping the block height at 1.2 meters, the area of the foam rise profile (D), that is to say volume of foam which has been generated by the mass of foam chemicals dispensed within the rise time, would have to be halved. (The rise time is normally determined by the chemical formulation and for this exercise should be considered fixed).

Figure 2B:
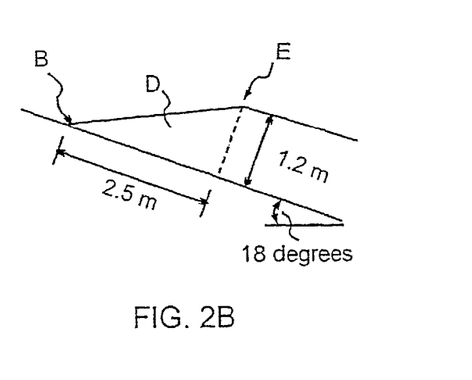

FIG. 2B shows the geometric representation of the theoretical half-size machine. The angle of the top of the foam profile cannot be made steeper, or slumping will occur. The angle of the conveyor must therefore be increased to 18 degrees to achieve the required shape of foam expansion profile. But such a steep conveyor will certainly result in under-running. Halving the dimensions of the machine, whilst still keeping the same block height, is therefore not possible.

In conventional slabstock processes there is always a relationship between the conveyor angle and the height of foam block to be produced at a given input of liquid reactant mix. If the conveyor angle is too small, liquid reactant mix or expanding foam will flow backwards. If the angle is too great, under-running will occur. Both of these effects are undesirable and will cause defects in the finished foam product.

Figure 3:
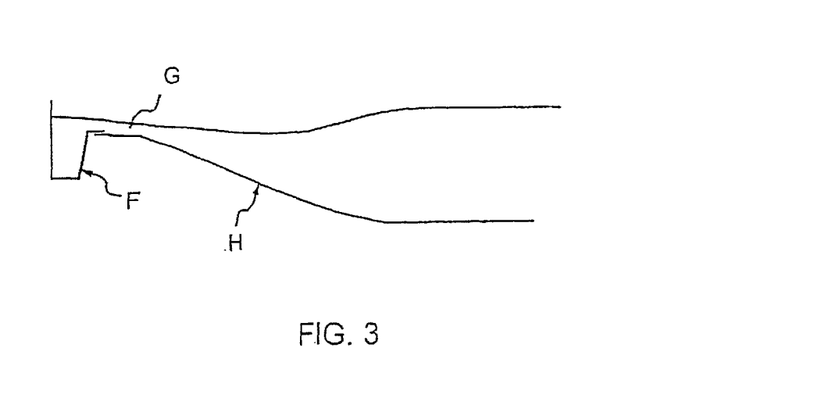
FIG. 3. Schematic of known trough and fall plate machine

The book "Flexible Polyurethane Foams" published by Dow Plastics, second edition 1997, pages 5.22–5.23, describes a foam process (the 'Maxfoam'—trade mark—process) where the liquid reactant mix is allowed to pre-expand in a trough (F) such that the emerging material is at about 5–10% of its final volume expansion before it flows at (G) onto the conveyor. The first part of the conveyor is called a fall-plate (H) in this process. Because the foam already has a lower density and higher viscosity at this point, it is less prone to under-running and the angle of the fall-plate (H) can be greater (typically about 12 degrees average inclination). This enables higher blocks to be produced for a given output of liquid reactant mix and physical dimensions of the machine. There are however still limitations to how much the fall-plate can be inclined. If too great an inclination is used then under-running will still occur.

THE INVENTION

The invention is set out in specific form in the claims but may perhaps be most broadly stated as a process and machine for production of foam where at least the first part of the expansion takes place in a closed diverging expansion chamber, the chamber feeding a generally horizontal take off path for the foam produced and itself being fed with reactants from a closed feed zone.

Conveniently the base of the chamber is formed by a horizontal conveyor, or a conveyor that is upwardly inclined at least initially, but as already noted the conveyor can be downwardly inclined to such degree as does not give under-running problems.

Only the early stages of expansion need necessarily take place in the expansion chamber, as slumping is not a problem if a free upper face of the foam is of limited height and of older, less-fluid foam.

In one embodiment the enclosure may conveniently be formed from surfaces consisting of the conveyor at the base, a pair of travelling sidewalls, and an upwardly inclined travelling topwall. Seals are provided at the junctions of the four surfaces, and at the feed zone, to prevent leakage of liquid reactant mix or expanding foam.

Such a machine is well suited to making rectangular-section block, the conveyor and travelling walls having or being formed of paper or plastics webs. However, other configurations are possible, for example a single web may be guided to form a lay-flat tube with overlapped edges which runs past a reactant feeder and is then guided to form a circular section enclosure to give round block for peeling.

In summary the invention can provide continuous horizontal production of foamed material wherein foam forming materials are fed at a controlled rate to a closed diverging expansion enclosure disposed at one end of a conveyor and foamed material is drawn away at the other end of the conveyor at a corresponding rate; at least the initial part of the foam expansion takes place in the enclosure bounded laterally and vertically by moving sheet materials, the materials travelling with the foaming material in paths diverging in at least one plane; and the enclosure is defined at its inlet by a closed feed zone sealed against said moving sheet materials and at its exit end by foam which has already partly or fully expanded.

PRIOR PROPOSALS

Figure 4:
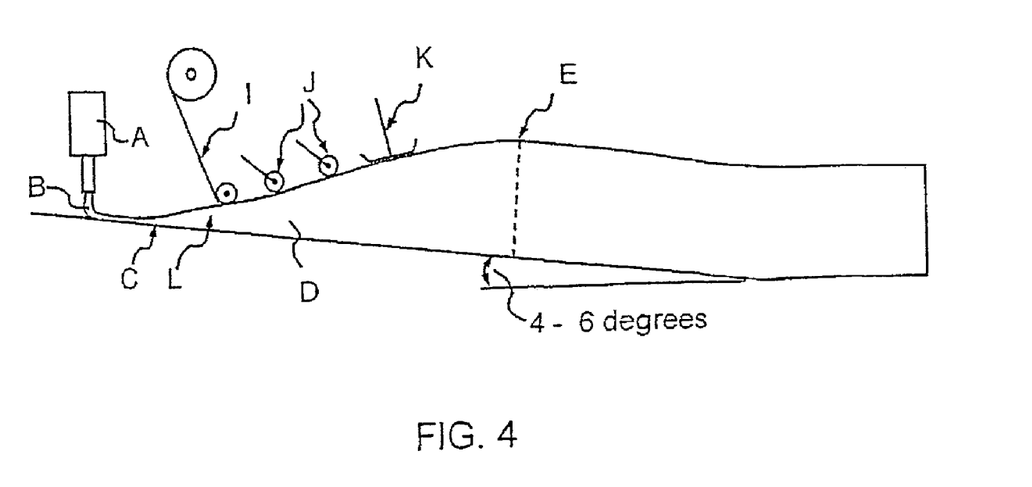
FIG. 4. Representation of a known top-paper machine (del Carpio), as used in practice FIG. 5. Side view of a machine according to the invention FIG. 5A View as in FIG. 5 but with shorter top conveyor FIG. 6. Top view of the machine of FIG. 5

There are several publications which bear a superficial resemblance to the present proposals, but which on inspection are found to miss the essential novel features of the invention. For example FIG. 4 shows a modified representation of the drawing from U.S. Pat. No. 3,984,195 (del Carpio, assigned to Planiblock), which describes a foaming process, wherein a top paper or plastics film (I) is applied to the top of the expanding foam (D), forming a type of diverging enclosure. Rollers (J) or plates (K) are applied to the top surface of the paper or film to shape the foam. It is to be noted however that the liquid reactant mix (B) is freely poured onto the conveyor (C) before the top paper or film (I) is applied, there being no seal provided at the point of introduction (L) of the liquid reactant mix to the divergent enclosure. The arrangement, as drawn in del Carpio's specification, would thus not work, as the bottom conveyor (C) is horizontal and expanding foam would flow backwards out of the machine. In practice, Planiblock run the process as drawn in FIG. 4, with the conveyor at a downwardly inclined angle of about 4–6 degrees, to prevent such flow-back.

Similar processes are described in U.S. Pat. No. 4,150,075 (Willi Schmitzer et al), U.S. Pat. No. 5,665,286 (Sulzbach et al), U.S. Pat. No. 4,128,611 (Kolakowski et al) and U.S. Pat. No. 4,097,210 (Romanillos). A top paper or plastics film is applied to the top of the expanding foam to form a type of diverging expansion zone. All these processes however pour the liquid reactant mix freely onto the bottom conveyor before the top paper or film is applied and therefore would give the same problem of flow-back if the bottom conveyor were not inclined downwards in the direction of production.

Further published proposals are:

EPA 0 645 226 concerning unconstrained expansion of $CO_2$—frothed foam in a chamber or froth cavity that is not closed and has a strong forward slope at its base.

EPA 0 000 058 concerning, again, unconstrained expansion of foam in an unsealed enclosure with strongly forward sloping base.

DETAILS OF THE INVENTION

The bottom of the expansion enclosure is conveniently defined by a paper or plastics film sheet or web, which is continuously fed onto the main bottom conveyor.

The top of the enclosure may similarly be defined by a second paper or plastics web, constrained by a top inclined conveyor driven at about the same speed as the foam. Restraining surfaces may be used, such as a fixed board coated with a low friction surface or a perforated metal plate, through which air is blown to reduce friction between the sheet and the plate. The length of the top inclined conveyor, board or plate will depend on the fluidity of the foam. Foams which are fluid for a greater part of their expansion will require a greater length of constrained surface.

The sides of the expansion enclosure may likewise be defined by third and fourth papers or plastics webs, constrained by side walls.

The feed end of the expansion enclosure is defined by a closed feed trough or channel, which is fitted with seals which contact the webs as they pass it, and prevent leakage of foam. A suitable seal has been found to be a flexible plastic lip which is bonded to the periphery of the feed trough or channel at the point where the webs pass it. These flexible plastic lips are positioned such that they make intimate contact with the webs, thus forming a foam-tight seal.

The out-going end of the expansion enclosure is defined by expanded or partly expanded foam already produced.

The foam-forming chemicals may be fed in several ways:

i) A liquid mix may be fed directly into the expansion enclosure through a narrow channel whose width is the same as the expansion enclosure and which is sealed against the four webs.

ii) The liquid mix may be fed into a trough of volume sufficient to allow some pre-expansion of the foam before it enters the expansion enclosure. The trough is fitted with seals to prevent leakage where the webs come in.

iii) The foam forming chemicals may be supplied as a froth, for example a froth produced by dissolving gas, such as carbon dioxide under pressure and then releasing the pressure under controlled conditions. Such froth may readily be fed into the expansion zone, with seals to prevent leakage.

The height of the foam block will be related to the density of the fully expanded foam and can be varied by adjusting input rate of the foam-forming mix and/or the conveyor speed.

The width of the foam block may be fixed in the case of a simple low-budget machine. However provision may be made for it to be changed by adjusting pre-set positions of the sidewalls and by utilising different widths of in-feed channels or troughs.

An arrangement is also possible where the width of the block may be changed during running, "on-the-fly". In such a case, the main sidewalls, after the expansion enclosure, are continuously adjustable in or out, to change the width of the block. The sections of the sidewalls which form part of the expansion enclosure are pivoted at the in-feed end and can swing in or out at the expansion enclosure exit, to coincide with the settings of the main sidewalls.

Cylindrical block, suitable for peeling, can be produced. The expansion enclosure may be essentially as described, but at a point where the expanding foam is still fluid, it passes through suitably shaped formers which cause the block formed to be of a circular cross section. The main conveyor in such an instance may consist of a flexible belt, which can be formed into a semi-circular shape to support the cylindrical foam block.

BRIEF DESCRIPTION OF THE DRAWINGS

A list of the drawings, which as to FIGS. 1 to 4 have already been discussed, is.

Figure 5:
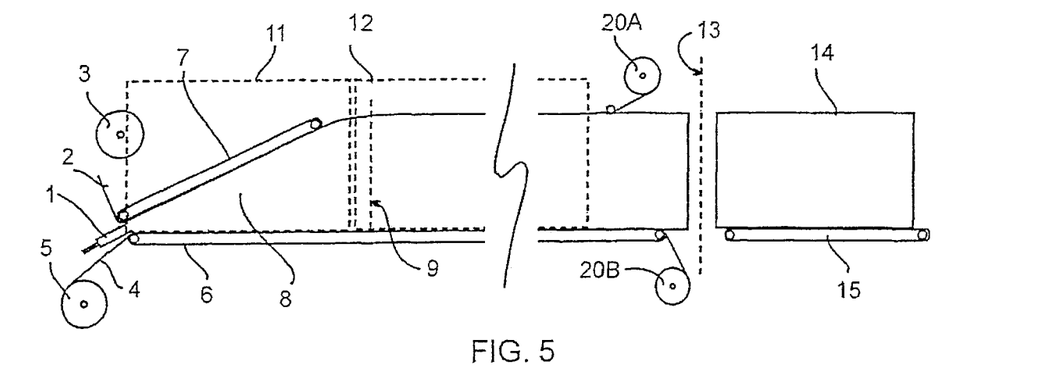
Figure 6:
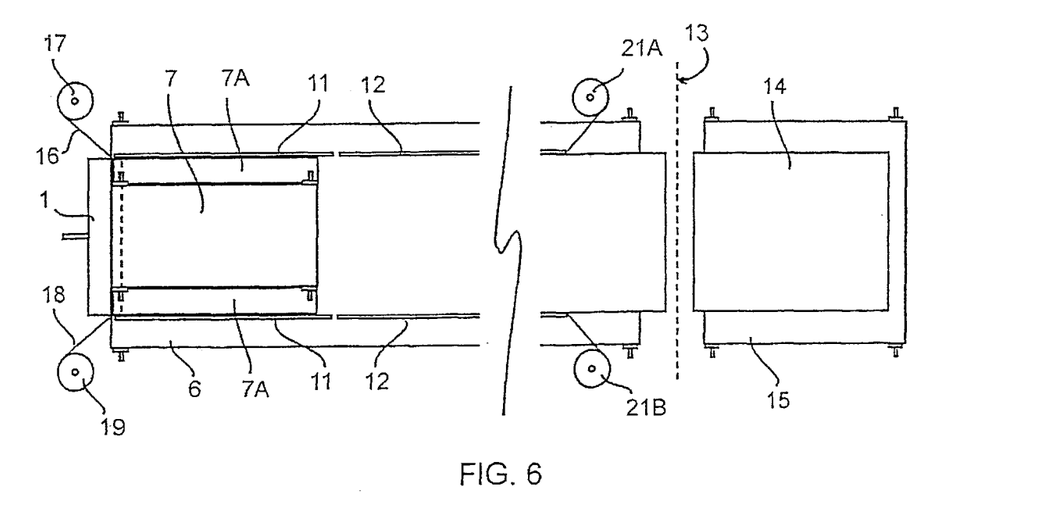

The drawings FIGS. 5 and 6 show, respectively, a side view and a top view of a machine according to the invention, in basic form. The expansion enclosure (8) is defined by a main lower conveyor (6), an upper, inclined conveyor (7) with adjustable or interchangeable edge support plates (7A) to allow for adjustment of block width, and two side walls (11), which seal against them. Main side walls (12) defining the block width adjoin the walls (11). Papers or plastics films (2, 4, 16 and 18) are fed in from unwind rolls (3, 5, 17 and 19), past an in-feed trough (1) to line the inside surfaces of the expansion enclosure (8). They move with the conveyor and against the inner surfaces of the side walls, separating them from the outer surfaces of the foam block. The trough, which is drawn spaced from the papers/films for clarity, is in fact sealed against them. The papers or films may be removed from the foam block and rewound onto rolls (20A, 20B, 21A and 21B) before the foam reaches a cut-off knife (13). Alternatively, some or all of the papers or films may be left adhered to the surface of the foam block.

The main conveyor (6) determines the speed of the foam block. The upper inclined conveyor (7) is driven at the same speed, or slightly faster than the main conveyor (6).

The foam-forming chemical mix is delivered from a mixing head into the feed trough (1). The volume of the trough determines the time delay before the chemical mix or partially expanded foam enters the expansion enclosure (8). The early part of the foam expansion takes place inside the expansion enclosure (8), and the remaining expansion up to the full-rise position (9) continues outside the expansion enclosure.

The time from full-rise (9) to the cut-off knife (13) is determined by the speed and length of the conveyor (6). The cut block (14) is removed by a take-off conveyor (15).

Figure 5A:
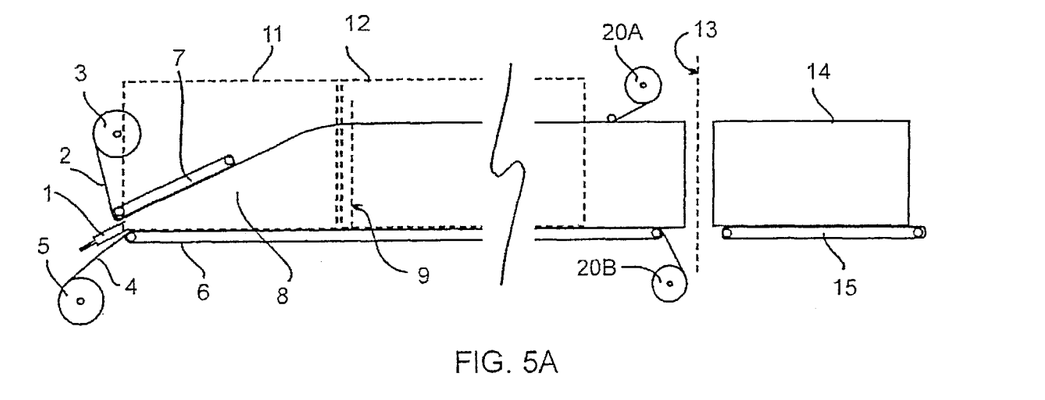

FIG. 5A shows a modification to the machine in FIG. 5 and FIG. 6, where the top, inclined conveyor (7) is shorter. Whereas in FIG. 5 and FIG. 6 the foam exiting from the expansion zone (8) is expanded to approximately 80–90% of the final volume expansion, in FIG. 5A it is about 50–60% of the final volume expansion. Such a situation is consistent with a foam type where the froth viscosity develops more rapidly and the expanding foam becomes self-supporting in a shorter time. This is typical of a rigid polyurethane foam and some types of high-resilience flexible foams.

Figure 7:
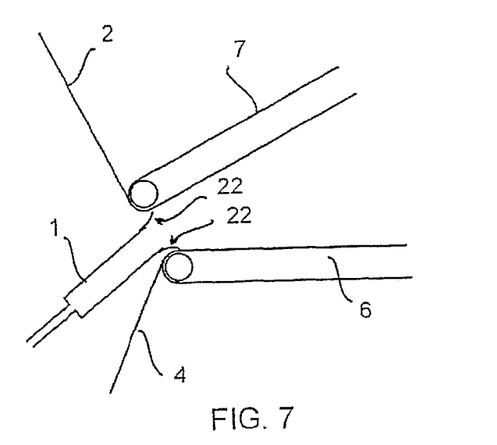
FIG. 7. Detail of in-feed seal

FIG. 7 shows a close-up view of the sealing arrangement of the trough (1) against the papers or plastics films (2 and 4) as they run past it, onto the conveyor and side-wall inner surfaces. Flexible lip seals (22) are fixed to the edges of the trough so that they contact the papers or films and prevent leakage.

Figure 8:
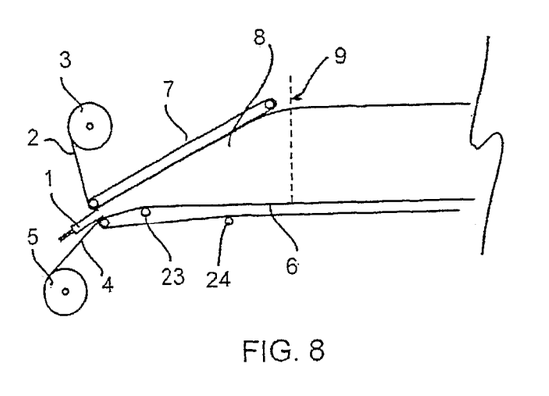
FIG. 8. Partial side view of machine with initial backwards (upward) conveyor orientation FIG. 9. Partial top view of variable block width machine FIG. 10. Partial side view of modified machine with outgassing provision FIG. 11. Partial side view of further modified machine FIG. 12. Top view corresponding to FIG. 11

FIG. 8 shows a modification to the machine in FIG. 5 where the bottom conveyor (6) is made to incline backwards (i.e. upwards) at the feed end of the expansion enclosure (8) by the introduction of additional rollers (23 and 24). This is advantageous in the case of foam formulations that are particularly fluid during the early stages of foam expansion.

Figure 9:
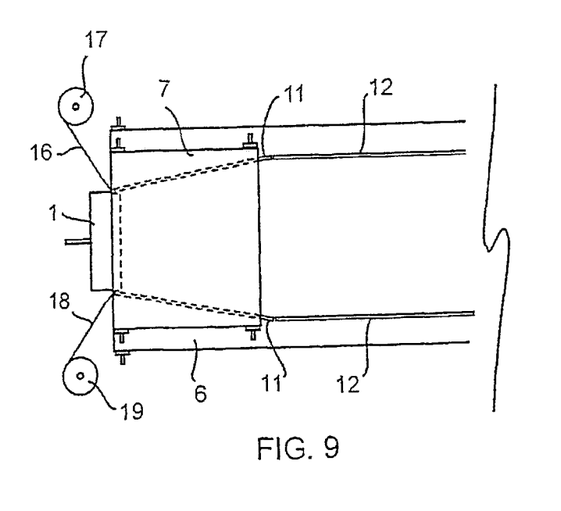

FIG. 9 shows a further modification of the machine in FIG. 5 where the main side walls (12) can be moved in or out to change block width, and sections of the side walls (11) fit between the main conveyor (6) and the upper inclined conveyor (7). They are pivoted at a point close to the fixed width in-feed trough (1) and are thus able to swing in and out to match the position of the main side walls (12) when they are moved to make a change in block width. Such an arrangement allows width changes to be made whilst running, or "on-the-fly", without changing the size of the infeed trough.

Figure 10:
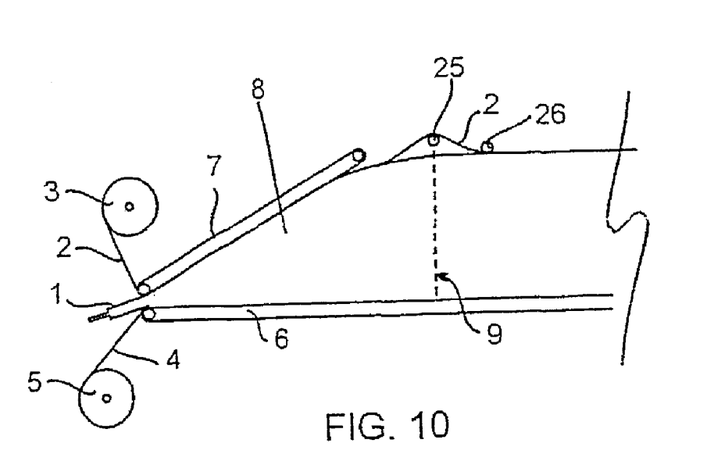

FIG. 10 shows a further modification to the machine in FIG. 5 where the top paper or film is temporarily lifted off the upper surface of the block, to release gases evolved at the full-rise position, by roller (25) and then re-applied by roller (26).

Figure 11:
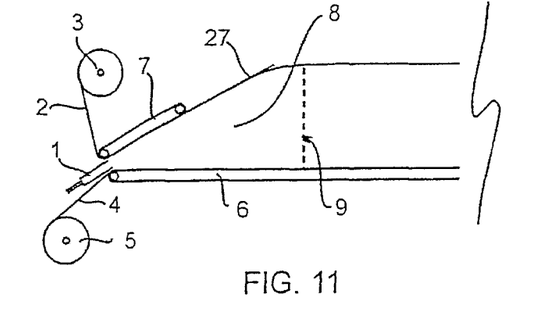
Figure 12:
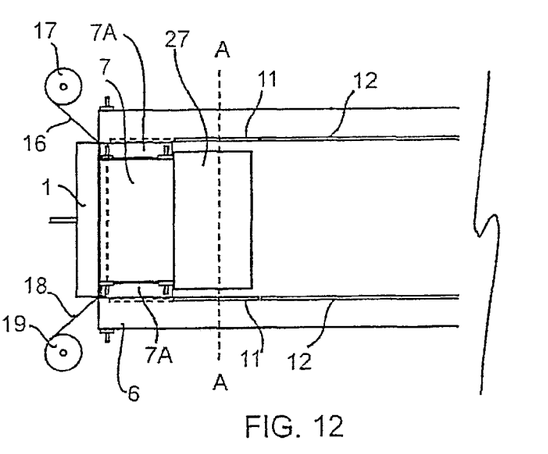

FIG. 11 and FIG. 12 show side view and top view respectively of a further modification to the machine in FIG. 5. The upper inclined conveyor (7) and the edge support plates (7A) have been shortened in the direction of production and the areas which have been removed are replaced by a board or metal plate (27) having a low-friction surface.

The board (27) is narrower than the distance between the expansion enclosure sidewalls (11), as shown in FIG. 12. The upper edges of the expanding foam within the part of the expansion chamber defined by the conveyor (7) and the edge support plates (7A) are constrained. When the expanding foam reaches the narrower board (27) the upper edges are now unconstrained and the foam is able to expand upwards higher at the edges than in the centre.

Figure 13:
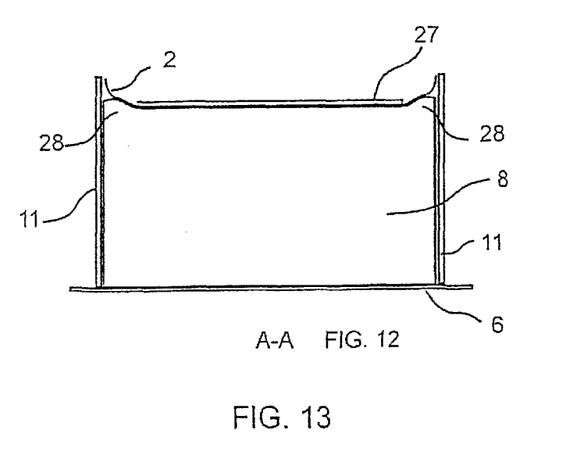
FIG. 13. Section from FIG. 12, showing block configuration

FIG. 13 shows a cross-section through the process at Section A—A of FIG. 12. The board or metal palate (27) restrains the foam expansion over the main part of the block, but at the top edges (28) the foam has expanded more, creating slightly raised top corners on the finished foam block. This results in a foam block that can be trimmed to give a fully rectangular cross-section, with minimal cutting waste.

Figure 14:
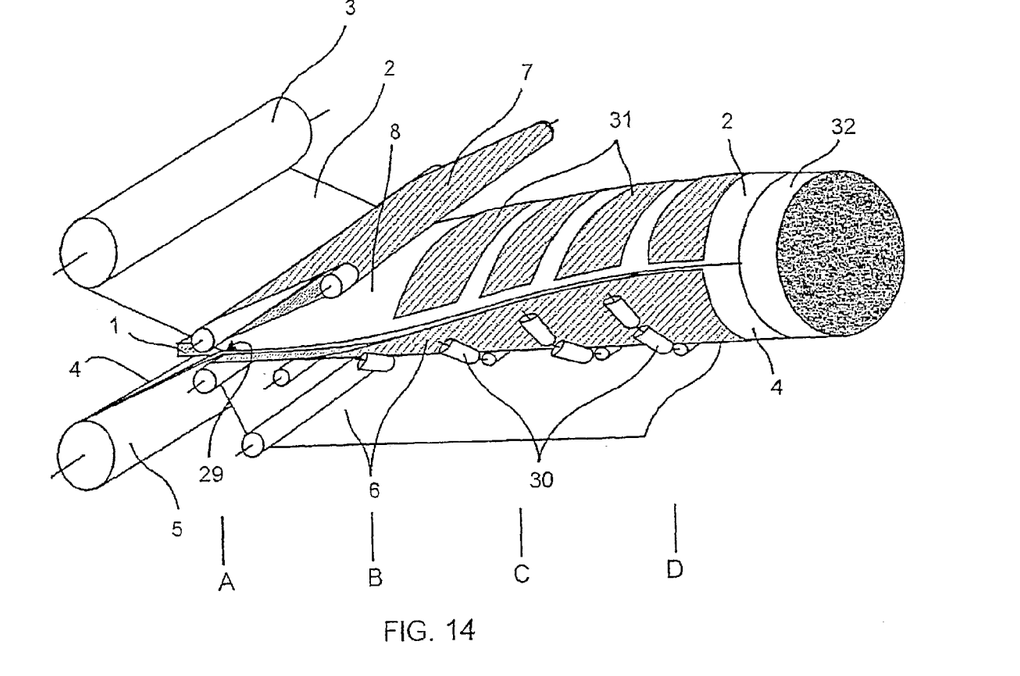
FIG. 14 to 16 Views of a machine for forming 'round block' for peeling
Figure 15:
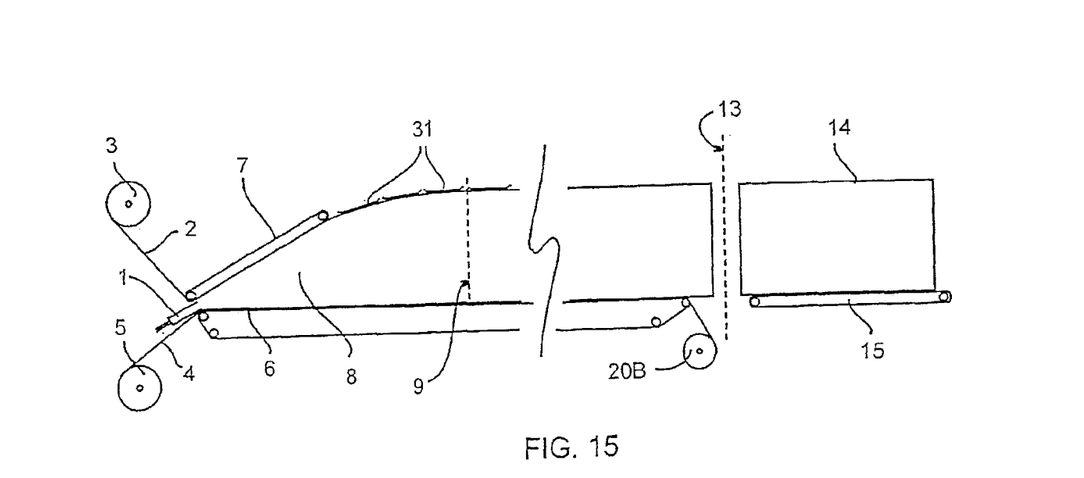

FIG. 14 and FIG. 15 show a general three-dimensional view and side view respectively of a modified machine, designed to produce cylindrical foam blocks for peeling. The chemical reactants are fed into the expansion zone (8) through the in-feed trough (1), which is sealed against the two moving films (2) and (4). The edges of the two films (2) and (4) are bonded together (29) as they contact each other at the sides of the in-feed trough (1), so forming an expansion zone (8) in the form of a continuous flexible sleeve.

The shape of the upper part of the expansion zone is determined by the top, inclined conveyor (7). The initial part of the bottom, main conveyor (6) is flat and determines the shape of the lower part of the expansion zone.

The bottom, main conveyor is flexible in the transverse direction and is progressively shaped from flat to semicircular cross-section by a series of rollers (30).

Curved steel shaping elements (31) are positioned at the top of the expanding foam contained in the flexible film sleeve. These help to maintain the circular cross-section of the foam block.

Cylindrical blocks of the required length are cut off by the knife (13).

Figure 16:
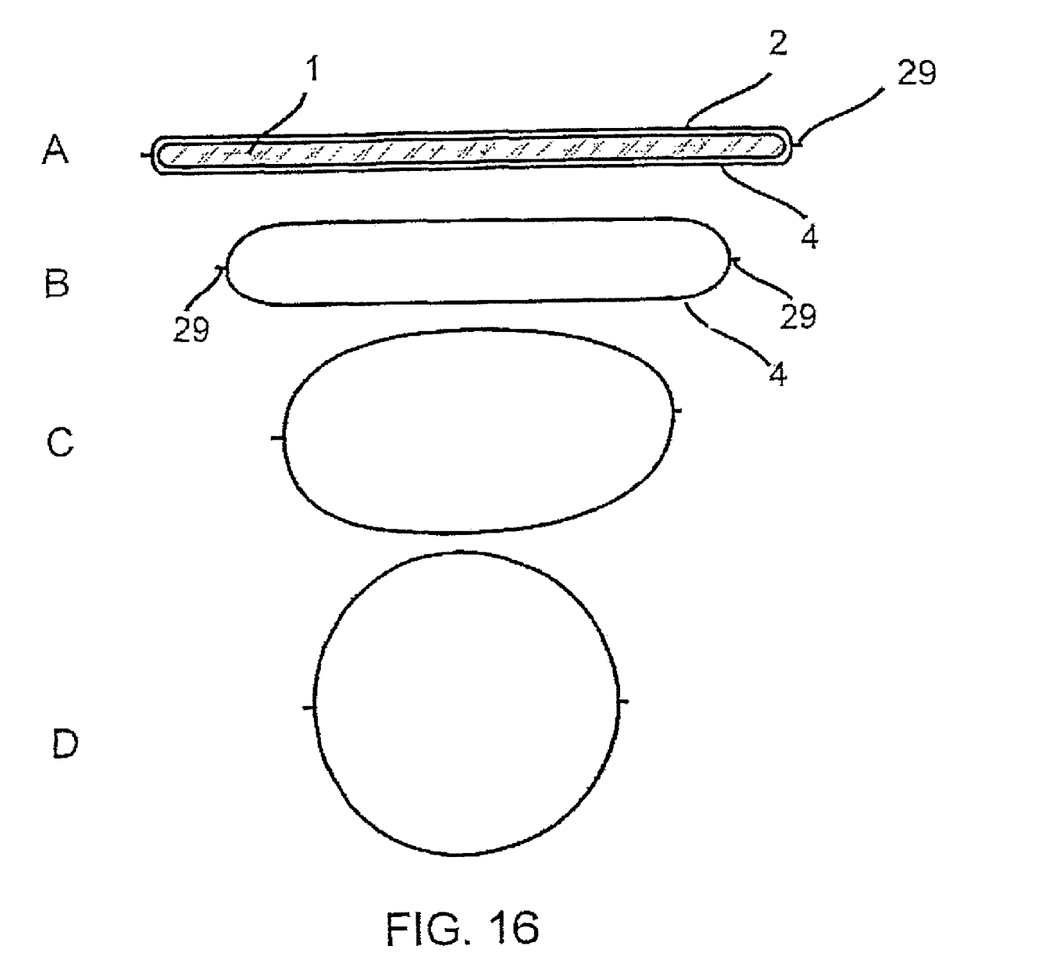

FIG. 16 shows progressive cross-sections through the expansion zone (8) at points A–D indicated in FIG. 14. At point A the cross-section is virtually flat and follows the shape of the in-feed trough (1). At points B, through to D, the cross-section increases in area as the shape becomes gradually more circular.

PROCESS EXAMPLES

Example 1

A machine according to FIG. 5 was used, having the following dimensions:

| | |
|---|---|
| Main conveyor total length | 12 meters |
| Main conveyor width | 2.4 meters |
| Upper inclined conveyor length | 2.5 meters |
| Upper inclined conveyor width | 2.2 meters (conveyor + adjustable edge-plates) |
| Inclination of upper conveyor | 26° to horizontal |
| Distance between sidewalls | 2.2 meters |
| In-feed trough (l) volume | 35 liters |

Chemical formulation, related to parts by weight per hundred of polyol:

| | |
|---|---|
| Polyol - Voranol CP3322 (Dow Chemicals) | 100.00 |
| Toluene diisocyanate - T80 (Bayer) | 53.24 |
| Water | 4.20 |
| Silicone BF2370 (Goldschmidt) | 1.00 |
| Amine catalyst - Niax Al (Crompton) | 0.05 |
| Amine catalyst - Dabco 33LV (Air Products) | 0.15 |
| Tin catalyst - stannous octoate | 0.20 |

These materials are in themselves conventionally used for manufacture of flexible polyether polyurethane foam slabstock and thus:

Voronol CP3322 is a poly (propylene-ethylene) triol, molecular weight 3500

T80 is 80:20 Toluene diisocyanate

Tegostab B 2370 is a proprietary silicone surfactant suitable for flexible polyether slabstock production Niax A1 and Dabco 33LV are proprietary tertiary amine catalysts suitable for flexible polyurethane foam slabstock production.

Running conditions:

| | |
|---|---|
| Polyol input | 70 kg/mm |
| Total chemical input | 110 kg/mm |
| Conveyor speed | 1.8 meters/minute |
| Full-rise distance (from mouth of in-feed trough) | 2.5 meters |
| Block height (hot) | 1.2 meters |
| Block width (hot) | 2.2 meters |
| Time from in-feed to cut-off | 6.7 minutes |

A foam block of good quality was produced, having a sample-piece density of 22.5 kg/m³.

Example 2

A machine according to FIG. 5 was used, having the following dimensions:

| | |
|---|---|
| Main conveyor total length | 12 meters |
| Main conveyor width | 2.4 meters |
| Upper inclined conveyor length | 2.5 meters |
| Upper inclined conveyor width | 2.2 meters (conveyor + adjustable edge plates) |
| Inclination of upper conveyor | 22° to horizontal |
| Distance between sidewalls | 2.2 meters |
| In-feed trough (l) volume | 40 liters |

Chemical formulation, related to parts by weight per hundred of polyol:

| | |
|---|---|
| Polyol - Voralux HN 360 (Dow Chemicals) | 100.00 |
| Toluene diisocyanate - T80 (Bayer) | 31.80 |
| Water | 2.20 |
| Silicone Tegostab B-8681 (Goldschmidt) | 0.90 |
| Amine catalyst - Niax Al (Crompton) | 0.12 |
| Amine catalyst - Dabco 33LV (Air Products) | 0.24 |
| Cross-linker - diethanolamine | 0.70 |
| Liquid FR (fire retardant) additive - trichloropropylphospate | 5.00 |
| Tin catalyst - dibutyltin dilaurate | 0.25 |

These materials are again in themselves conventionally used for manufacture of flexible high resilience polyurethane foam slabstock and thus:

Voralux HN 360 is an ethylene oxide tipped poly (propylene-ethylene) triol, molecular weight 5000, suitable for manufacture of high-resilience slabstock T80 is 80:20 Toluene diisocyanate Tegostab B-8681 is a proprietary silicone surfactant suitable for high-resilience foam slabstock production Niax A1 and Dabco 33LV are proprietary tertiary amine catalysts suitable for flexible polyurethane foam slabstock production.

Running Conditions

| | |
|---|---|
| Polyol input | 110 kg/min |
| Total chemical input | 150 kg/min |
| Conveyor speed | 1.5 meters/minute |
| Full-rise distance (from mouth of in-feed trough) | 2.8 meters |
| Block height (hot) | 1.1 meters |
| Block width (hot) | 2.2 meters |
| Time from in-feed to cut-off | 8.0 minutes |

A high resilience foam block of good quality was produced, having a sample-piece density of 42 kg/m³

Example 3

A machine with block width adjustment "on the fly", according to FIG. 9 was used, having the following dimensions:

| | |
|---|---|
| Main conveyor total length | 12 meters |
| Main conveyor width | 2.4 meters |
| Upper inclined conveyor length | 2.5 meters |
| Upper inclined conveyor width | 2.3 meters |
| Inclination of upper conveyor | 26° to horizontal |
| Distance between sidewalls | adjustable 1.8 to 2.3 meters |
| In-feed trough volume | 25 liters |

Chemical formulation, related to parts by weight per hundred of polyol:

| | |
|---|---|
| Polyol - Voranol CP3322 (Dow Chemicals) | 100.00 |
| Toluene diisocyanate - T80 (Bayer) | 56.94 |
| Water | 4.60 |
| Methylene chloride blowing agent | 5.00 |
| Silicone BF 2370 (Goldschmidt) | 1.40 |
| Amine catalyst - Niax A1 (Crompton) | 0.05 |
| Amine catalyst - Dabco 33LV (Air Products) | 0.15 |
| Tin catalyst - stannous octoate | 0.30 |

Running conditions (at start):

| | |
|---|---|
| Polyol input | 43 kg/min |
| Total chemical input | 73 kg/min |
| Conveyor speed | 1.7 meters/minute |
| Full-rise distance (from mouth of (in-feed trough) | 2.5 meters |
| Block height (hot) | 1.2 meters |
| Block width (hot) | 1.9 meters |
| Time from in-feed to cut-off | 7.0 minutes |

The initial distance between the sidewalls (12) was set at 1.9 meters. After running for 30 minutes, the distance between the sidewalls (12) was increased slowly, over a period of 30 seconds to 2.1 meters, the hinged sidewalls (11) associated with the expansion enclosure moving simultaneously so that their ends remained in line with the start of the main sidewalls. As the sidewalls were moved outwards, the chemical output was increased to 48 kg/min polyol (82 kg/min total).

Samples of foam taken from the blocks of 1.9 m and 2.1 meters width both had a sample piece density of 18 kg/m$^3$. The length of the foam block of varying width associated with the change in width was only 1 meter.

Advantages

Overall, the invention gives a new slabstock process which allows (but is not necessarily restricted to) running at lower output than conventional processes, and which will produce full-sized foam blocks and run a full range of foam types and grades.

The invention can be applied to any foam slabstock process which produces foamed plastics from an expandable liquid reactant mixture, for example rigid polyurethane foam, phenolic foam, epoxy foam, silicone rubber foam.

The new machine has a low capital cost and is suited to the needs of the smaller manufacturer, who may require 2000 tonnes or less of finished foam annually. Large conventional machines need to make relatively long production runs to be efficient but a low-output machine produces efficiently on shorter runs. Rates of chemical emissions can be reduced, making treatment of those emissions easier The machine occupies a small floor area, thereby requiring a smaller factory. Also, the floor area necessary for curing the blocks, before using or transporting them is reduced.

Particularly, the lower rate of chemical metering results in a proportional decrease in the quantity of fumes emitted by the process. This has the advantage that any fume-scrubbing equipment required by local authorities for limiting atmospheric emissions can be smaller in size and of reduced cost.

Another application in which the invention is valuable is variable pressure foaming.

It is a well-known principle that if the ambient air pressure under which foaming is conducted changes the foam density changes accordingly. Reduced air pressure results in proportionally lower foam density. In high altitude locations (e.g. Mexico City) it is found that foam densities are significantly lower than at locations at sea level, when running the same formulation.

Many processes have been described where the foaming process is enclosed within a pressure/vacuum chamber so that the air pressure can be artificially controlled, thereby providing a means of controlling the foam density. These processes need a complicated system of transfer conveyors and air-locks to enable cut blocks to be removed to normal atmospheric pressure, whilst maintaining the foaming process at a pressure different from atmospheric. The overall size of the machine, including transfer conveyors and air-lock, is related to conveyor speed. When a conventional foaming process, for example 'Maxfoam' (trade mark) with conveyor speed of about 5 meter/minute, is used, this results in a long total process which is very expensive. If the basic foam machine can be shortened and the conveyor speed reduced, say to one third that of the conventional process, a significantly smaller pressure controlled plant can be envisaged. This significantly lowers costs and is what the present invention provides.

A similar saving is made in forced cooling processes, where volumes of air are drawn though the hot foam block, a short time after foaming, to cool it to such a temperature where it can be handled.

The polyurethane foam reaction is strongly exothermic. The main contribution to the exotherm is the water-isocyanate reaction. Consequently, greater quantities of water and isocyanate in the chemical mixture result in hotter foam blocks.

It is generally considered that 165° C. is a safe maximum exotherm temperature and foam producers will generally limit water and isocyanate levels to keep within this limit.

The cellular structure of foam makes it a relatively good heat insulator. This means that freshly produced hot blocks of foam take a long time to cool down to ambient temperature before they can be used. Typically, this cooling time is 6 to 12 hours.

Several processes have been described, where air is drawn through the hot foam block, shortly after production, by standing it on a suction table or conveyor. This cooling process typically takes about 10 to 15 minutes, the time being determined by the porosity of the foam block. If the cooling process is to be continuous and in-line with the foaming process, the conveyor speed must be the same. For a standard Maxfoam machine this will be about 5 meters/minute. The cooling process therefore has to be 59–75 meters long to provide the required cooling time.

A shorter foam machine, running at a slower conveyor speed, of say 2 meters/minute, as described in this invention, will require a cooling conveyor only 20–30 meters long to achieve the same cooling time.

The invention claimed is:

1. A method of producing foamed slabstock in a horizontal machine comprising reactants being fed through a reactant feed zone to a conveyor at one end of the machine and foam produced being removed at the other end, wherein in order to support and constrain the rise profile of a body of expanding foam while in the fluid state:

the reactant feed zone is closed, with no exposure of reactants to the atmosphere, the foam is generated in an expansion chamber closed at its inlet by the reactant feed zone, at its outlet by a body of foam already expanded or partly-expanded, at top sides and bottom by traveling webs, the traveling webs sealed to the inlet, the chamber has a cross-section area that progressively increases in the direction of production, the base of the expansion chamber is not inclined forwards or is so inclined by no more than 10 degrees to the horizontal.

2. The method of claim 1, wherein the base of the expansion chamber being inclined forwards at no more than 4° to the horizontal.

3. The method of claim 1, wherein the foam continues to expand after exiting the expansion chamber, having at exiting reached at least 30% of its full-rise volume and a consistency at which its rise profile can be maintained without slumping.

4. The method of claim 1, wherein at least an initial section of the conveyor and thus at least part of the base of the expansion chamber slopes backwards in the production direction at up to 30° to the horizontal the foam leaving this section having reached at most 60% of its full-rise volume, whereby the body of foam produced does not have to change direction after it has ceased to be fluid.

5. The method of claim 1, wherein the feed zone is the exit from a trough sealed against the webs and itself fed with reactants, expansion of the foam optionally starting in the trough.

6. The method of claim 1, wherein the reactants are initially in the form of a froth produced by release of pressure on a dissolved gas.

7. The method of claim 1, wherein movable sidewalls allow the cross-machine width of the expansion chamber and hence the block width produced to be varied.

8. The method of claim 1, wherein the webs are guided to a circular cross section while the foam is still fluid, to give a round block for peeling.

9. The method of claim 1, wherein the top face of the expanding foam is fully constrained centrally but only by a web at the sides, whereby the foam can displace the web to rise at the sides above the general plane of the top face, obviating the formation of rounded block shoulders and minimising trimming waste in forming square-cornered block.

10. The method of claim 1, wherein a top web is retained on the block produced but is lifted temporarily at or around full rise to allow outgassing.

11. The method of claim 1, performed within an enclosure wherein the pressure can be maintained at a value above or below atmospheric pressure to influence the final foam density, the enclosure being provided with appropriate air lock to enable removal of foam blocks to atmosphere without significantly influencing the pressure inside the enclosure.

12. The method of claim 1, wherein the foam blocks produced are conveyed through a forced-cooling station where air is drawn though the foam blocks to cool them.

13. An apparatus for the production of foamed materials, wherein in use reactants are fed through a reactant feed zone to a conveyor at one end of the machine and foam produced is removed at the other end, and in order to support and constrain the rise profile of a body of expanding foam while in the fluid state comprising:

a reactant feed zone that is closed, with no exposure of reactants to the atmosphere, an expansion chamber closed at its inlet by the reactant feed zone, at its outlet by a body of foam already expanded or partly-expanded, at top sides and bottom by traveling webs, the traveling webs sealed to the inlet, wherein the chamber has a cross-section area that progressively increases in the direction of production, and the base of the expansion chamber is not inclined forwards or is so inclined by no more than 10 degrees, to the horizontal.

14. The apparatus of claim 13, wherein the base of the expansion chamber being inclined forwards at no more than 4° to the horizontal.

15. The apparatus of claim 13, wherein the expansion chamber is dimensioned to allow foam to continue to expand after exiting the expansion chamber, having at exiting reached at least 30% of its full-rise volume and a consistency at which its rise profile can be maintained without slumping.

16. The apparatus of claim 13, wherein at least an initial section of the conveyor and thus at least part of the base of the expansion chamber slopes backwards in the production direction at up to 30° to the horizontal, allowing foam leaving this section to reach up to 60% of its full-rise volume, whereby the body of foam produced does not have to change direction after it has ceased to be fluid.

17. The apparatus of claim 13, wherein the feed zone is the exit from a trough sealed against the webs and having means to be itself fed with reactants, expansion of the foam optionally starting in the trough.

18. The apparatus of claim 13, having means to feed reactants initially in the form of a froth produced by release of pressure on a dissolved gas.

19. The apparatus of claim 13, wherein movable sidewalls allow the cross-machine width of the expansion chamber and hence the block width produced to be varied.

20. The apparatus of claim 13, wherein the webs are guided to a circular cross section while the foam is still fluid, to give a round block for peeling.

21. The apparatus of claim 13, wherein the top face of the expanding foam is frilly constrained centrally but only by a web at the sides, whereby the foam can displace the web to rise at the sides above the general plane of the top face, obviating the formation of rounded block shoulders and minimising trimming waste in forming square-cornered block.

22. The apparatus of claim 13, wherein a top web is retained on the block produced but is lifted temporarily at or around full rise to allow outgassing.

23. The apparatus of claim 13, wherein the apparatus is contained within an enclosure wherein the pressure can be maintained at a value above or below atmospheric pressure to influence the final foam density, the enclosure being provided with appropriate air lock to enable removal of foam blocks to atmosphere without significantly influencing the pressure inside the enclosure.

24. The apparatus of claim 13, wherein the foam blocks produced are conveyed through a forced-cooling station where air is drawn through the foam blocks to cool them.

* * * * *